Aug. 22, 1939.　　　　　F. B. YINGLING　　　　　2,170,742
LOCOMOTIVE
Original Filed Feb. 4, 1933　　　4 Sheets-Sheet 1
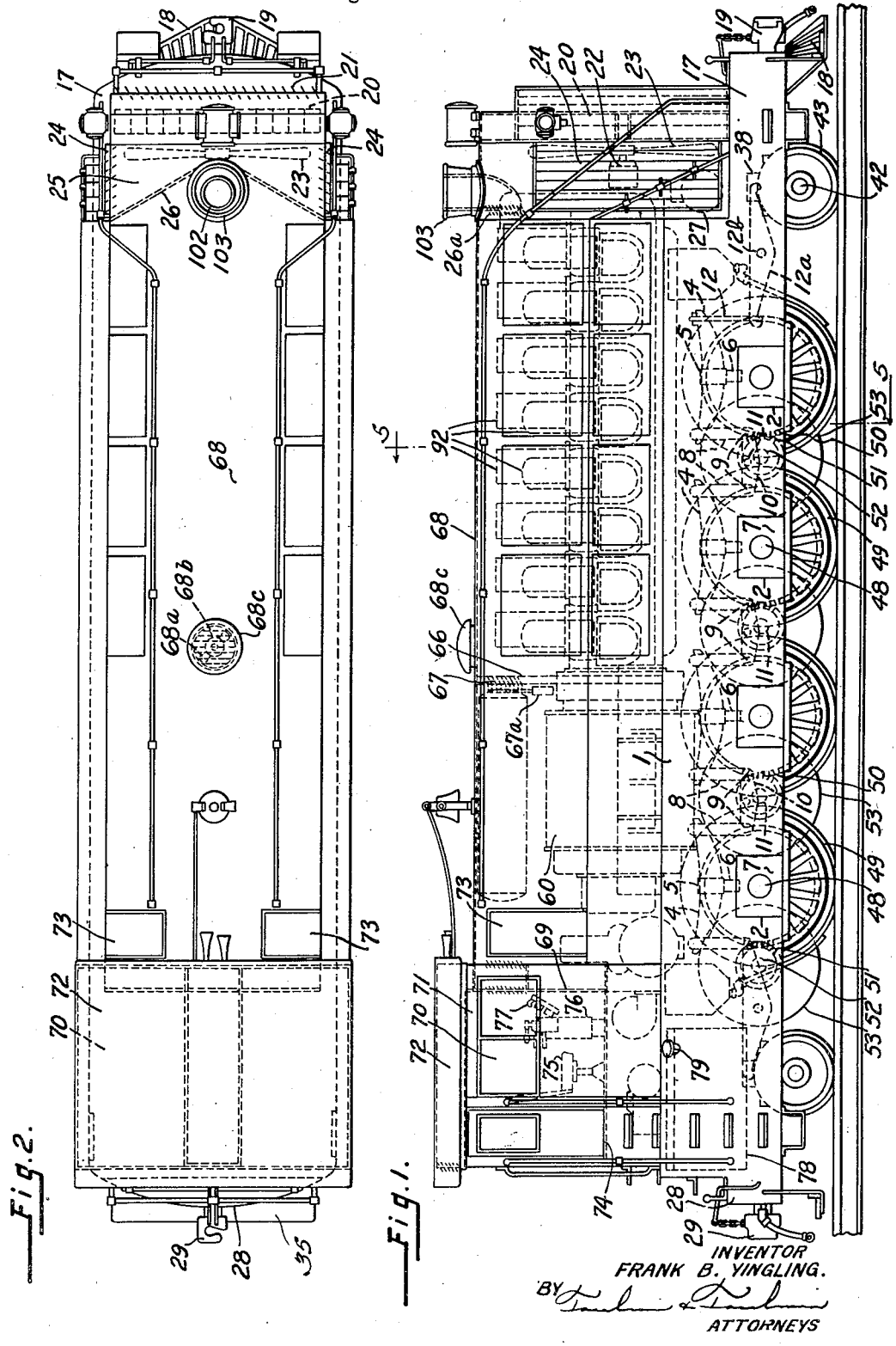
INVENTOR
FRANK B. YINGLING.
BY
ATTORNEYS Aug. 22, 1939.　　　F. B. YINGLING　　　2,170,742
LOCOMOTIVE
Original Filed Feb. 4, 1933　　4 Sheets-Sheet 2
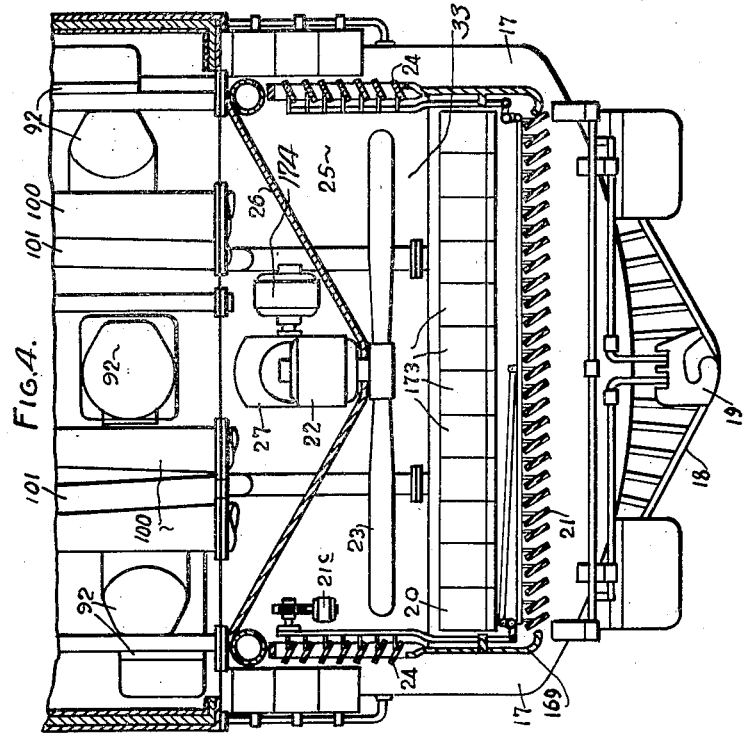
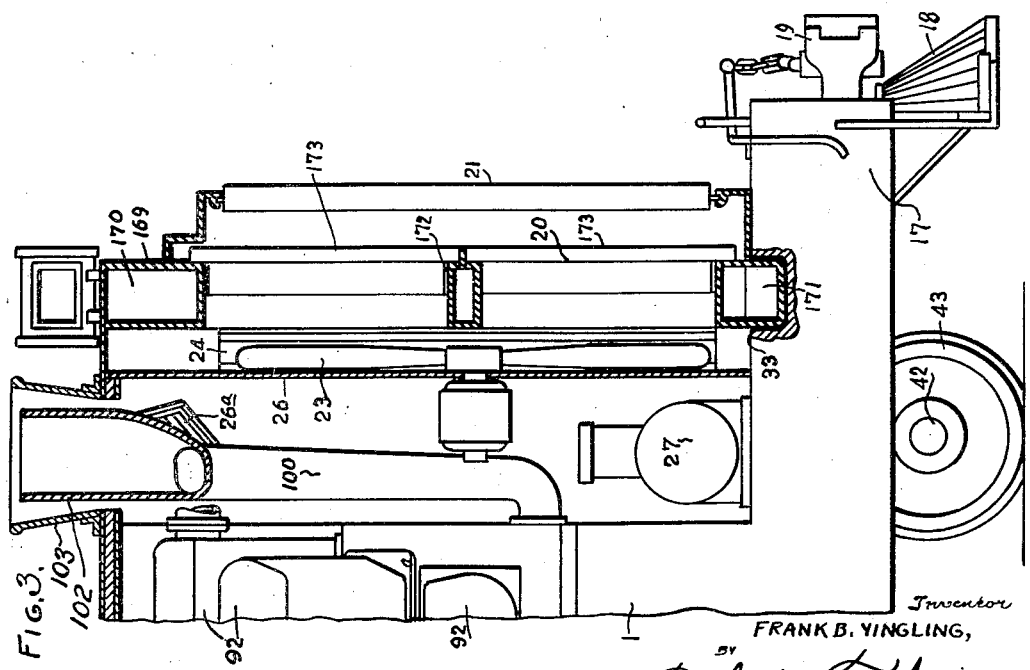
Inventor
FRANK B. YINGLING,
BY
Attorneys

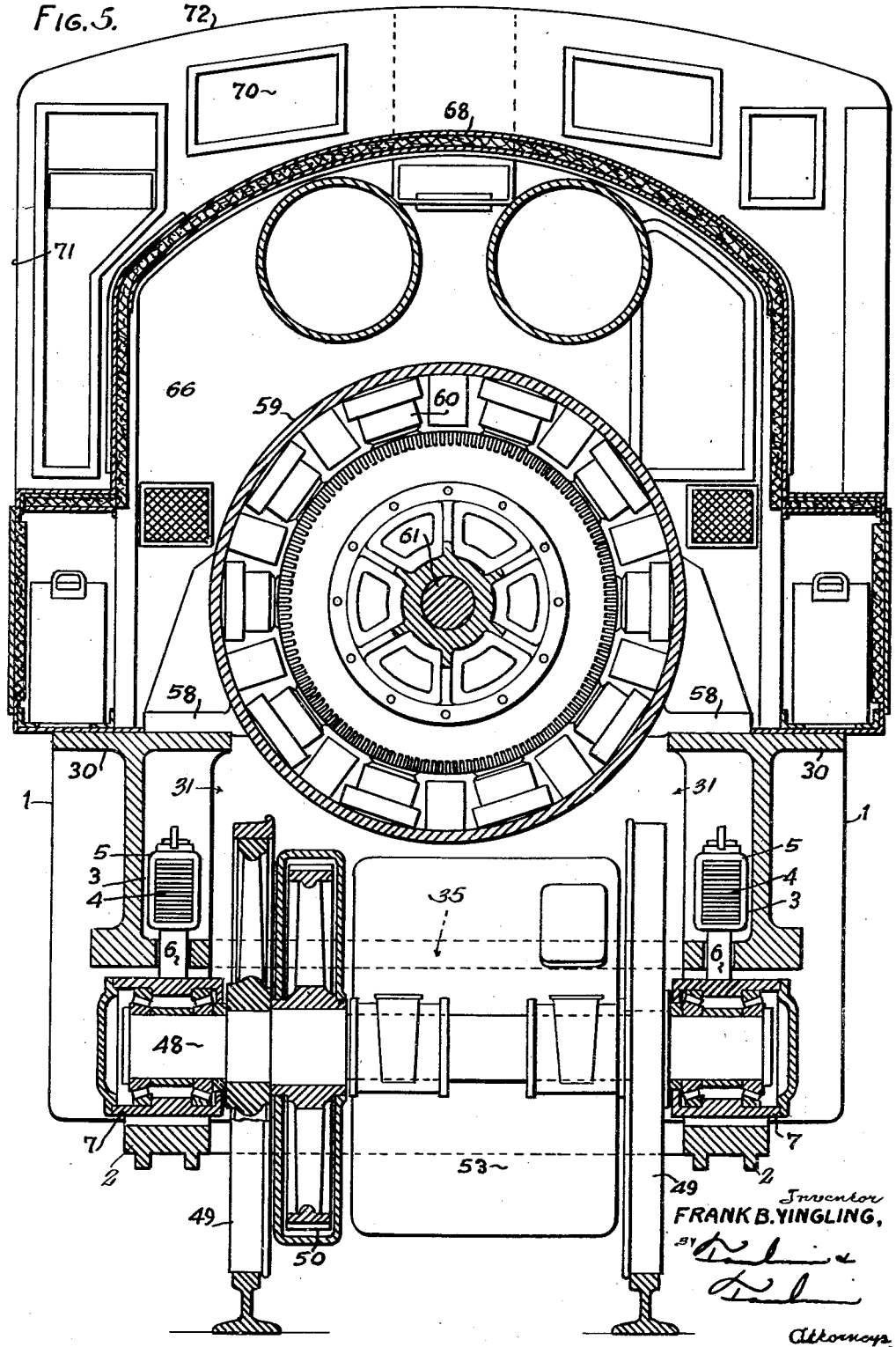

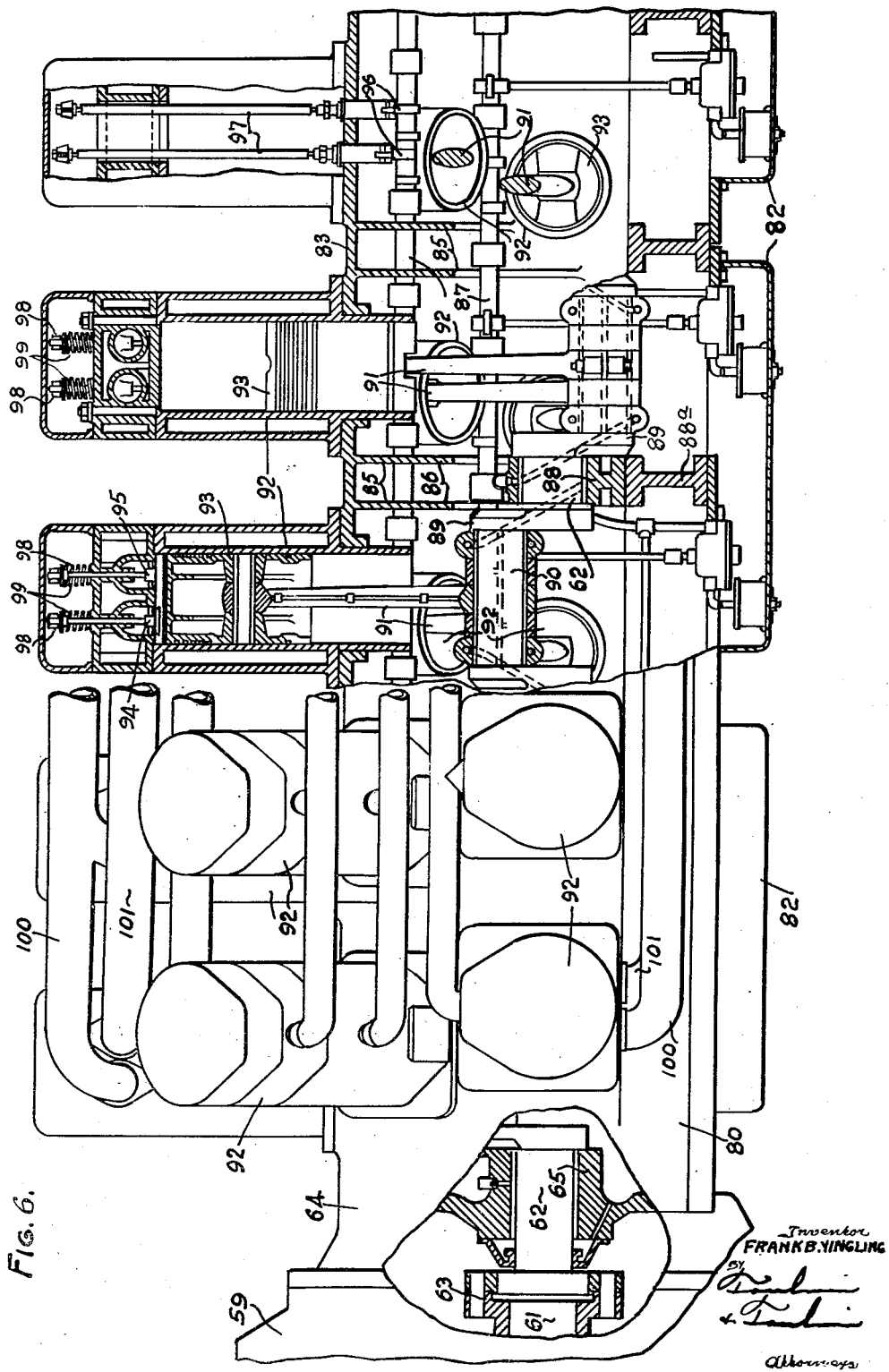

Patented Aug. 22, 1939

2,170,742

UNITED STATES PATENT OFFICE 2,170,742

LOCOMOTIVE

Frank B. Yingling, Hamilton, Ohio

Original application February 4, 1933, Serial No. 655,241. Divided and this application November 26, 1934, Serial No. 754,734

2 Claims. (Cl. 105—35)

It is the object of my invention to provide a Diesel electric locomotive for main line, freight and passenger service, which has hereto been unknown in the art.

It is my object to provide a construction of internal combustion motor, such as a Diesel motor, of adequate horsepower to constitute a main line, freight and passenger service locomotive and still be of such size as to be mounted within the limits of a locomotive chassis.

It is my object to provide in a single internal combustion engine connected to a single generator a multiple cylinder, multiple bank Diesel engine so arranged as to come within the limits of the size permitted for a locomotive and to be so arranged as to be mounted upon a locomotive frame so that adequate space will be left for the motors and associated running gear of the locomotive supplied with current and driven by the generator driven by the engine.

It is my object to provide as high as 20 horsepower per ton of locomotive while using a Diesel electric drive where heretofore the maximum ever achieved has been 10 horsepower per ton for switching work and it has been considered prohibitive to get a Diesel engine of sufficient horsepower to accomplish 20 horsepower per ton for line work and still stay within the limitations for size and appearance in a main line locomotive.

It is my object to provide multiple bank engines ranging in horsepower, approximately from 1500 to 6000 horsepower, the tonnages extending from approximately 100 tons to 500 tons for the locomotive and thereby to make possible locomotive tonnages and horsepowers greater than the capacity of present-day steam locomotives while still using Diesel electric drives.

It is my object to provide such an arrangement and design of the motor that these large tonnages and very large horsepowers can be built within the confines of an ordinary locomotive with an adequate low center of gravity, adequate control of ventilation and proper clearances for use on main line railways for passenger and freight service.

Heretofore in the art small size switching locomotives employing the Diesel electric principles have been used but of inadequate horsepower and tonnage for main line service; and, in particular, these switching locomotives are incapable of performing other than switching service where short runs, light loads and high initial torque but with low horsepower are the requirements, but no one heretofore has been able to provide a main line locomotive having sufficient tonnage and horsepower capacity for that service due to the fact that in the construction of locomotives, and particularly Diesel engines heretofore customary in the art a Diesel engine of 1000 horsepower would be larger in size than the locomotive itself in its entirety and could not be transported on a chassis by reason of its prohibitive size and insufficient horsepower for main line use.

It is my object to provide in this arrangement a one-piece locomotive frame supported by the running gear and which carries the load and positions the engine and generator in association with the motors and running gear.

In particular, it is my object to provide multiple banks of cylinders using a common crank case, a common crank shaft and the connection to a common crank on the crank shaft of piston rods of cylinders in general transverse alignment but in or out of alignment to permit of a parallel connection on a single crank of mountable piston rods emanating from the respective cylinders.

It is my object to provide a Diesel engine with relatively large cylinders of approximately 100 horsepower per cylinder while, at the same time, being able to have multiple cylinders and multiple banks of such cylinders within the size limits of a main line locomotive.

It is an object to provide for such an engine a radiator control which can be adjusted according to the temperature of the air which will have an independent electric drive for the cooling fan, will have a diversion system for the air passing over the radiator to control the amount of such air which will be diverted out of the locomotive over the engine, and it is my object to provide a vacuum system of radiation in order to secure adequate radiation for the horsepower of the engine while still retaining the radiator within the size limits of the locomotive.

It is an object to provide means of controlling the air flow over the radiator when the direction of the locomotive is reversed so that the direction of the fan will be reversed upon the direction of the locomotive controller.

It is my object to provide a rigid frame construction comprising a deep integral frame on which is mounted the Diesel engine and in which, in order to get the lowest center of gravity, is mounted the generator and motors for driving the trucks.

It is my object to provide an electric generator directly connected to the Diesel engine and the unit with the engine mounted directly on the one-piece integral steel frame casting.

This application is a division of my co-pending application Serial No. 655,241, filed February 4, 1933.

Figure 1 is a view in side elevation of a locomotive of the Diesel-electric type in which my invention is embodied.

Figure 2 is a top plan view of the locomotive, as shown in Figure 1.

Figure 3 is an enlarged longitudinal vertical sectional view at the front of the locomotive showing the radiator cooling system for the locomotive, and a portion of the unitary main frame of the locomotive.

Figure 4 is a horizontal sectional view and partial top plan view at the front of the locomotive, showing the stepped down front platform or deck forming part of the main frame, upon which deck are supported the radiator cooling system.

Figure 5 is an enlarged transverse vertical sectional view as at line 5—5 of Figure 1, showing the main frame with the generator depending between and supported on the side walls of the main frame, together with the generator compartment, and the locomotive cab.

Figure 6 is a partial side elevation and partial sectional view longitudinally of the engine, and showing especially the connection between the crank shaft of the engine and the shaft of the generator, for transmission of power.

Frame—Chassis construction

Referring to the drawings in detail, 1 designates a one-piece side frame and chassis casting adapted to receive the journal boxes in the recesses 2. 3 indicates side frame recesses for receiving the springs 4 which are carried by clips 5 on thrust pins 6 mounted on the journal blocks 7 reciprocating in the slideways or recesses 2 of the chassis frame 1. These springs 4 are connected at their ends to pitmen 8 pivoted at 9 to rocking links 10 pivoted at 11. Thus, as shown in Figures 1, 10 and 11, a series of side spring 4 are interconnected with one another by means of pitmen 8, and rocking links 10, to equalize the action of one another and have the free ends of the end spring members connected by depending links 12 to longitudinally-disposed rocking arms 12a respectively pivoted at 12b on the frame members 1. The free ends of arms 12a engage the center plate 38 of the truck 39. (See Figures 1, 11 and 18.) The truck 39 carries a side frame 40 resting on the journal blocks 41 of the axles 42 which carry the truck wheels 43 (Figure 11). The side frame 39 carries on the side thereof a side link 44 which rests on the journal boxes 41 at its free ends and is connected to the semi-elliptic spring 46 adjacent their respective centers, which spring 46 has its ends connected, by means of swinging links 45, to side frame 40. The truck 39, as shown in Figure 18, is swiveled at 47 to the main frame.

If desired, the springs 4 may, as shown in Figures 15 and 17, be located within recesses 3a on the inside of the main frame, in which event the free ends of the interconnected springs 4 carry yokes 4a which are pivoted to the cross equalizers 13 (Figure 17) which are centrally pivoted at 14 upon the upright support member 15, which is rigidly attached to the longitudinal frame member 16 and extends upwardly therefrom.

This one-piece frame is provided with a front or cow catcher end member 17 carrying the cow catcher 18 and coupler 19.

Ventilation—Radiator cooling

The ends 17 of the side walls of the main unitary frame are cut away to a lesser depth than the main side frame in order to permit of the mounting of the radiator 20 thereon together with the louver dampers 21, the fan motor 22, the fan 23 and the side louvers 24. Also, there is mounted in the area behind the air deflection chambers 25 formed by V-shaped partition 26 the vacuum pump 27. These cut away members 17 are united by a transversely extending horizontal platform or deck 33, depressed or stepped down below the top edges of the side walls of the main frame, for the support of the above named accessories of the locomotive.

The radiator 20 which is of sectional construction is located in front of the V-shaped partition 26 (Figure 2) and the latter is arranged at an angle of approximately 20 to 30 degrees from the center line sloping toward the center of the car on each side. The electric fan motor 22 may, if desired, be placed within the engine enclosures or as shown in the radiator enclosure.

As seen in Figures 3 and 4, the radiator 20, which is located ahead of the V-shaped wall 26, includes a frame 169 having top and bottom water headers 170 and 171, and a center header 172, cast integrally, and the radiator sections 173 are bolted to the headers to fill the top and bottom spaces between the headers.

The shutter blades 21 in front of the radiator and 24 at the sides of the deflecting chambers 23 are thermostatically controlled, and they are operated, preferably in unison, by a small motor 21c in a suitable power circuit.

When the locomotive is running forwardly, the blades of the fan 23 are arranged to draw in the air as it is ordinarily constructed, but, upon the reversal of the locomotive to run in the opposite direction, the controller for the main power motors is arranged with reversing contacts so that, if the locomotive is reversed, the air fan will be reversed and will force the air from the sides of the locomotive through the louvers 24 and out the front of the locomotive through the louvers 21.

In order to provide sufficient radiation I use a vacuum system to increase the efficiency of the radiator and, for this purpose, provide an electrical motor driven vacuum pump 27, driven by motor 174. This pump is thermostatically controlled by a thermostat; and is connected with the centrifugal pump that is used to circulate the water through all of the cylinders. The cylinders are all joined together with piping in the usual manner with headers as required, as hereinafter described.

The rear end of the frame (Figure 1) is likewise stepped down to form an end frame member as at 28, which end frame member includes a deck or platform 35 that unites the side walls of the main frame and carries the coupler 29.

The running gear is mounted upon this integral cast frame. This cast frame 1 is provided with longitudinally disposed upper transverse marginal flanges 30 acting as a support for the cab, auxiliary mechanism, generator and engines which span the gap between these side frame plates 30 leaving a central circulatory passageway for air.

Thus, I have provided relatively broad and low integral platforms at the front and rear of the engine structure comprising integral parts of a continuous casting forming the chassis frame, the intermediate side wall portions of which are narrow, deep and relatively high in order to locate the engine and generator at sufficient height above the running gear and driving motor to provide adequate clearance for the generator, motors and internal combustion engine driving the locomotive.

Running gear

The frame heretofore described is supported upon a plurality of transversely arranged power axles 48 mounted in the journal blocks 7 that are slidably guided in the ways 2 of the frame 1. These axles carry the power-driven wheels 49 which are associated with the driving gears 50.

In the form shown in Figure 1 these driving gears are actuated by the pinions 51 mounted on the armature shafts 52. The armature shaft is mounted within the driving motors 53. These motors are mounted within the side walls of the main frame and within the limits of the driving wheels between them in order to provide as low a center of gravity as possible for the running gear.

The exact form of connection between the motors and the driving wheels is not essential to my invention provided this apparatus has a low center of gravity supported, guided by and aligned with the master chassis frame and is kept within that frame to be protected thereby and to provide a low center of gravity.

Generator

Mounted upon the side frame cab plates or pads 30 are the supporting arms 58 of the frame 59 of the generator 60 (Figure 16). The armature shaft 61 of this generator is directly connected to the crank shaft 62 of the Diesel engine through the coupling 63 (Figure 13) (see Fig. 7). The casing 59 is bolted to the casing 64 forming a part of the crank case of the Diesel engine which drives the generator, which crank case also forms the bearing support at 65 for the rear end of the crank shaft 62 adjacent the coupling 63.

It will be noted that the generator is so mounted upon the side frame pads 30 that it is suspended between these members and depends to a point adjacent the motor 53 or other mechanism therebelow, thereby permitting the lowest possible center of gravity for the generator (Figure 16). This generator 60 is housed within the supporting compartment 68 formed by the partition wall 66 which has automatically controlled dampers or louvers 67 communicating with the engine compartment (Figure 1) and this partition wall 66 extends from side to side within the exterior roof 68. If desired, this generator 60 is separated by the partition 69 from the cab compartment 70 formed by the cam walls 71 and roof 72. A side window 73 is provided in the generator housing.

By this arrangement, the generator compartment may be kept at the desired temperatures in order to provide for the maximum efficiency for the generator and ventilation is provided to carry away the excessive heat therefrom which would otherwise reduce its efficiency.

Cab construction

As seen in Figure 1 the cab is provided with a raised floor 74 on which are mounted oppositely disposed seats 75 adjacent the controllers 76. Adjacent the controller is the instrument panel 77 indicating the condition of the apparatus controlled by the operator in the adjacent seat. Beneath the cab floor are located the following auxiliaries.

The fuel tank is located within the frame where it is thoroughly protected in case of accident and where there will be a low center of gravity and also where it can be easily filled. In Figure 1, the fuel tank is located within the frame 1 as at 78 provided with a filler spout extending through the filler frame as at 79. A capacity of about 1000 gallons is thus provided.

Internal combustion engine—Source of motive power

The basic problem in providing a locomotive of this tonnage and horsepower for main line use, which has never been solved heretofore, is to get sufficient horsepower in an internal combustion engine of sufficient flexibility and speed and of sufficiently light weight which at the same time will stay within the longitudinal and transverse dimensions required in a locomotive.

For this purpose, I have provided a multiple cylinder unitary engine having a plurality of banks of cylinders, the banks of the cylinders being so arranged that, when viewed transversely, the cylinders are preferably staggered with respect to one another to permit of the pistons of the transverse groups of cylinders, one from each bank, being connected to a common crank on the crank shaft 62.

Accordingly, I mount the engine foundation comprising the bed frame of the engine 80 upon bracket arms 81 which rest upon recessed surfaces 30 of the side frames 1. Between these lateral bracket arms 81 and within the longitudinal bed frame 80 are located sump pans 82 of the engine (Figures 17 and 20). Mounted upon this bed frame 80, which is relatively shallow, is a semi-circular crank case having an arcuate wall 83 Figure 6 and flat lower bed members 84 Figure 6 resting upon the bottom frame members 80. Thus, there is a flat bed member having supporting bracket arms and an auxiliary crank case mounted thereon.

This crank case contains the end bearings 65 for supporting the crank shaft 62.

Intermediate the length of this crank case are a plurality of transversely extending ribs 85 in Figure 6 which are ported at 86 to permit the passage of operating shafts, such as 87. These ribs terminate in bearings 88 for receiving and supporting the crank shaft 62 intermediate its ends and between the crank arms 89 which are connected together by the crank 90 upon which are mounted the piston rods 91 or other associated pieces of mechanism. These bearings 88 are supported upon transverse I-beam members 88a which are integrally formed between and are a part of the bed plate 80. Thus, the side walls of the bed plate are connected together and form intermediate their ends the foundation for the load and thrust imparted to the bearing blocks 88 of the crank case and such load and thrust are transmitted direct through the brackets 81 to the integral cast side frame or chassis frame 1 distributing the load directly into the wheels and thence to the rails.

Thus, the arcuate crank case, the arc of which is described substantially about the center of the shaft, is transversely braced by the pairs of partitions 85 which are arranged at intervals longitudinally of the case between the transverse series of cylinders mounted upon the crank case. These partitions also act in conjunction with the bearing supports 88 to support the crank shaft between the transverse series of cylinders and between the cranks 90 on which the piston rods 91 are mounted in parallelism for each group of transversely arranged, staggered cylinders 92. In Figure 6 it will be noted that these cylinders, when viewed from the side of the engine, are staggered with respect to one another so that their piston rods can be arranged in parallelism on the same crank 90. The engine is characterized by having a plurality of transverse series of cylinders thus staggered having their piston rods connected to the common crank; and the crank is supported at either end by the bearing blocks 88 that are in turn reinforced and supported by the transverse crank case ribs 85 and the transverse crank case I-beam rib 88a in the flat crank case base.

It will be further noted that the entire series of cylinders are distributed through substantially 180 degrees.

In Figure 6 it will be seen that pistons 93 are reciprocable in the cylinders, and the valves 94 and 95 control inlet of air to and exhaust of gases of combustion from the cylinders. The valves are actuated from shaft 87 by means of cams 96, pusher rods 97, rocker arms 98, and springs 99. The ports controlled by these valves are connected to the exhaust manifold 100 and the intake manifold 101, and the exhaust manifold discharges through the stack 102 in the stack-cap 103, as seen in Fig. 3.

Accordingly, my invention provides a single piece integral frame designed to use the longest, widest and most flexible springs in the spring pockets and provide a strong rigid and true bearing surface for mounting a Diesel engine and generator and maintain the generator in alignment.

The invention provides a multi-cylinder Diesel engine having a plurality of cylinders aligned longitudinally in series radially disposed in such series in an arc of approximately 180 degrees and mounted in an arcuate crank case with a relatively flat bottom which forms the mounting pad for the engine upon the frame.

I further provide in this invention transverse series of cylinders either in alignment or in alignment in groups or staggered with respect to one another, but, in any arrangement, so arranged that the associated transverse groups of cylinders will have their piston rods connected to a common crank on the common crank shaft to which all piston rods of all cylinders are connected.

I provide for the separation of the locomotive into a radiator compartment, an engine compartment, a generator compartment and a control cab compartment, each of which must have its own temperature or range of temperatures for the maximum efficiency of the mechanism and its respective compartments; and I provide for the control of that temperature in each compartment and the ventilation of each compartment.

I further provide a locomotive which can operate in either direction without disturbing its ventilation and cooling system and which may be controlled for operating in either direction, preferably with a common control station in a common cab or with interconnected cabs having a common control station.

By providing the bearings supported by the heavy cross ties of the crank case, the thrust of the explosion on the piston downwardly is taken directly on the bearings thus supported.

With reference to the V-shaped compartment for the radiator at high speeds, the air resistance plus the vacuum at the rear end of the locomotive is considerable requiring extra power to overcome this resistance. The streamline of the front and rear compartments for the fan permits the easy entrance and flow of the air out of this compartment aided by the fan which is used to cool the radiator. The air encountered will be deflected by the front partition of the engine compartment and will pass out through the side radiators or the side shutter when the locomotive is moving forwardly. It will be understood that in place of the side louver dampers or supplementing them I may employ side radiators. At the opposite end the air passes through the side shutters and out the end radiator as the vacuum created by the fan makes this possible thereby eliminating a large amount of air pressure which is an aid to cooling the radiators and reduces the head-on train resistance.

Having thus fully described my invention, what I claim as new and desire to secure by Letters Patent is:

1. In a locomotive having a unitary frame having side walls, a multiple bank Diesel engine having the banks arranged through an arc of 180 degrees above the frame and a generator connected to a common crank shaft of said engine, said generator being suspended between said walls of the frame; a radiator spaced from the engine, and means to guide the air through the front of the radiator and behind to one side of the radiator between the radiator and the engine, said walls being cut away at the front of the locomotive to support said radiator from a point below said engine to a point above it.

2. In a locomotive having a unitary frame having side walls, a multiple bank Diesel engine having the banks angularly disposed with relation one to another and arranged through an arc of 180 degrees above the frame and a generator connected to a common crank shaft of said engine, said generator being suspended between said walls of the frame; a radiator spaced from the engine, means to guide the air through the front of the radiator and behind to one side of the radiator between the radiator and the engine, said walls being cut away at the front of the locomotive to support said radiator from a point below said engine to a point above said engine.

FRANK B. YINGLING.